(12) United States Patent
Vahida et al.

(10) Patent No.: US 8,770,336 B2
(45) Date of Patent: Jul. 8, 2014

(54) MARINE SEISMIC SOURCE

(75) Inventors: Behzad Vahida, Saint Michel sur Orge (FR); Thierry Payen, Massy (FR)

(73) Assignee: CGGVeritas Services SA, Massy Cedex (FR)

( * ) Notice: Subject to any disclaimer, the term of this patent is extended or adjusted under 35 U.S.C. 154(b) by 0 days.

(21) Appl. No.: 13/811,919

(22) PCT Filed: Aug. 30, 2011

(86) PCT No.: PCT/EP2011/064919
§ 371 (c)(1),
(2), (4) Date: Jan. 24, 2013

(87) PCT Pub. No.: WO2012/028618
PCT Pub. Date: Mar. 8, 2012

(65) Prior Publication Data
US 2013/0112495 A1    May 9, 2013

(30) Foreign Application Priority Data

Aug. 30, 2010  (FR) ........................ 10 56845

(51) Int. Cl.
*G01V 1/04*  (2006.01)
*G01V 1/133*  (2006.01)
*G01V 1/02*  (2006.01)

(52) U.S. Cl.
USPC ............................ 181/120; 181/115; 181/110

(58) Field of Classification Search
USPC ................. 181/120, 119, 115, 113, 110, 111; 367/144, 153
See application file for complete search history.

(56) References Cited

U.S. PATENT DOCUMENTS

| 3,437,170 | A | * | 4/1969 | Brock et al. | 181/120 |
| 3,491,848 | A | * | 1/1970 | Giles | 367/17 |
| 4,016,952 | A | * | 4/1977 | Reed et al. | 181/118 |
| 4,364,446 | A | * | 12/1982 | Thomas et al. | 181/120 |
| 5,432,757 | A | | 7/1995 | Chelminski | |
| 8,205,711 | B2 | * | 6/2012 | Hopperstad et al. | 181/111 |
| 2009/0147626 | A1 | * | 6/2009 | Vahida et al. | 367/173 |

FOREIGN PATENT DOCUMENTS

GB   2 454 802 A   5/2009
WO   01/71385 A1   9/2001

OTHER PUBLICATIONS

International Search Report issued in corresponding International application No. PCT/EP2011/064919, date of mailing Nov. 16, 2011.
Preliminary Search Report issued in corresponding French application No. 1056845 on Apr. 20, 2011.
Written Opinion issued in corresponding French application No. 1056845 on Aug. 30, 2010.

* cited by examiner

*Primary Examiner* — Edgardo San Martin
(74) *Attorney, Agent, or Firm* — Patent Portfolio Builders PLLC

(57) ABSTRACT

The invention concerns a device for emitting seismic waves designed to operate by being towed by a vessel, characterized in that it comprises means capable of discharging compressed air under high pressure into water, to generate a bubble (44) of a general annular shape.

20 Claims, 14 Drawing Sheets

FIG. 5
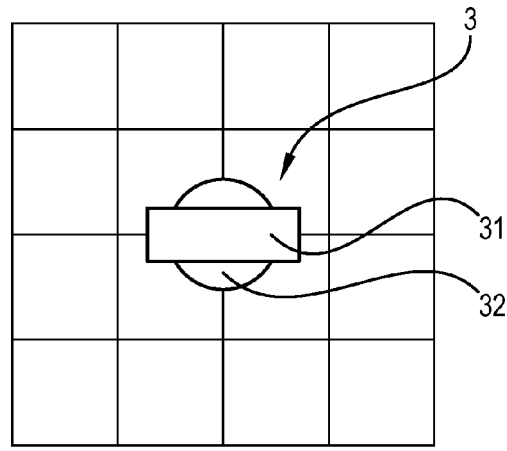
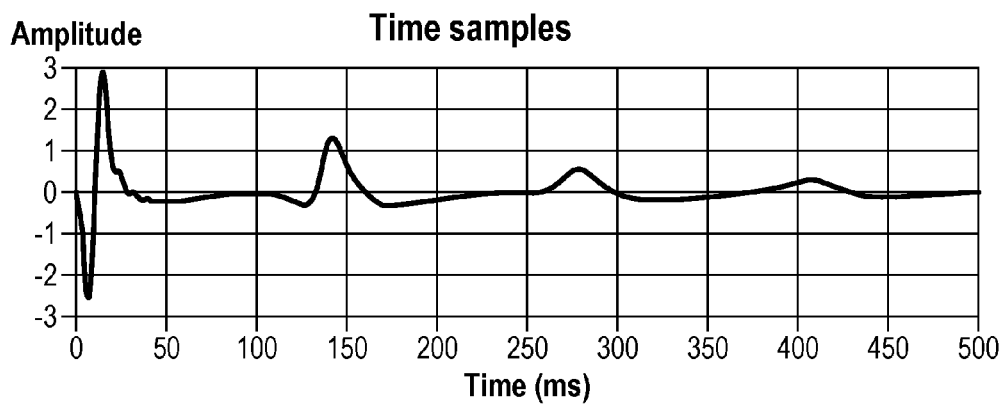
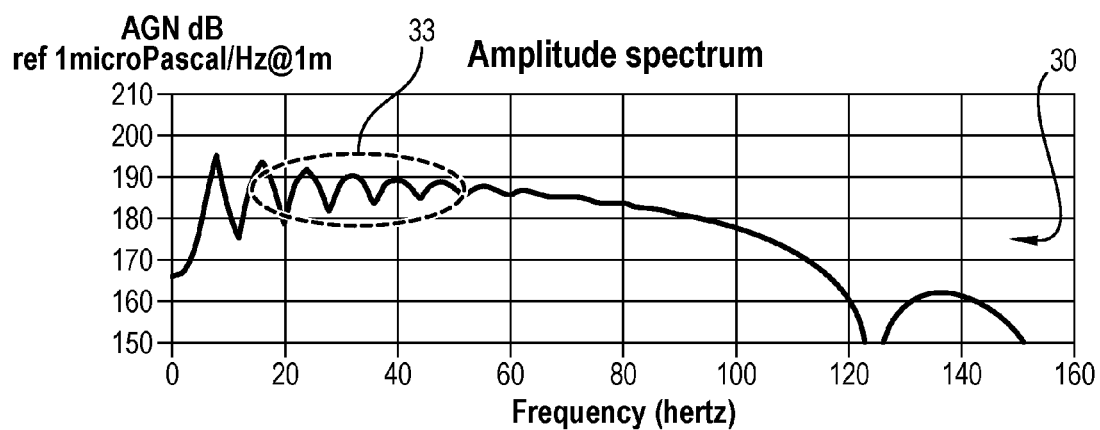

FIG. 6
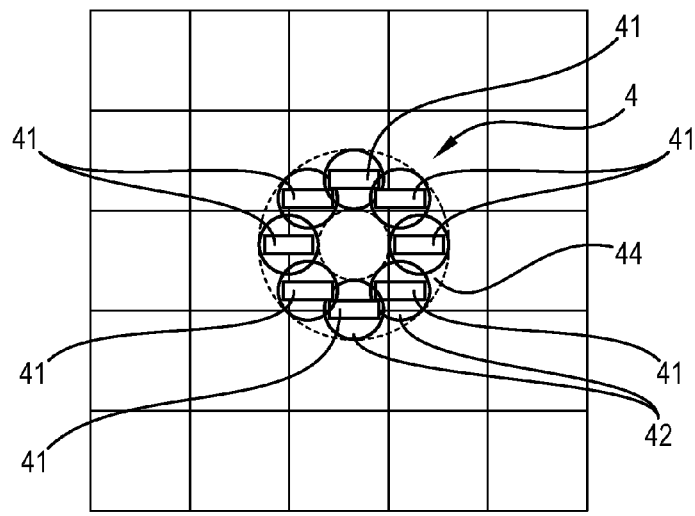
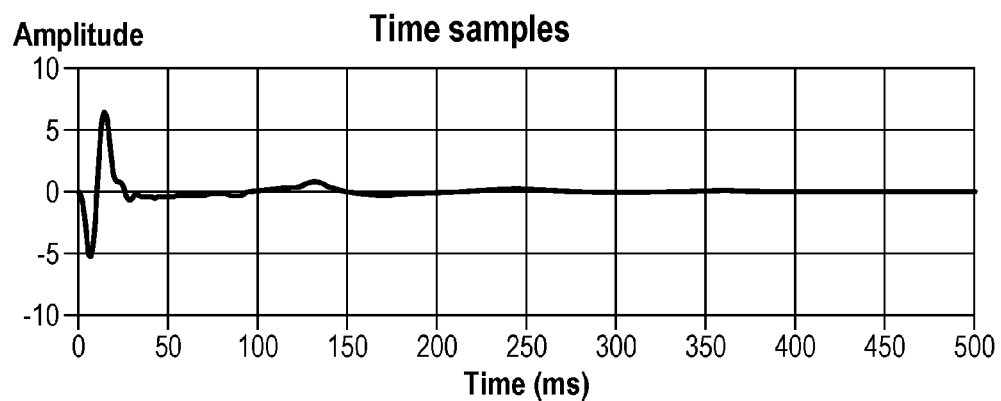
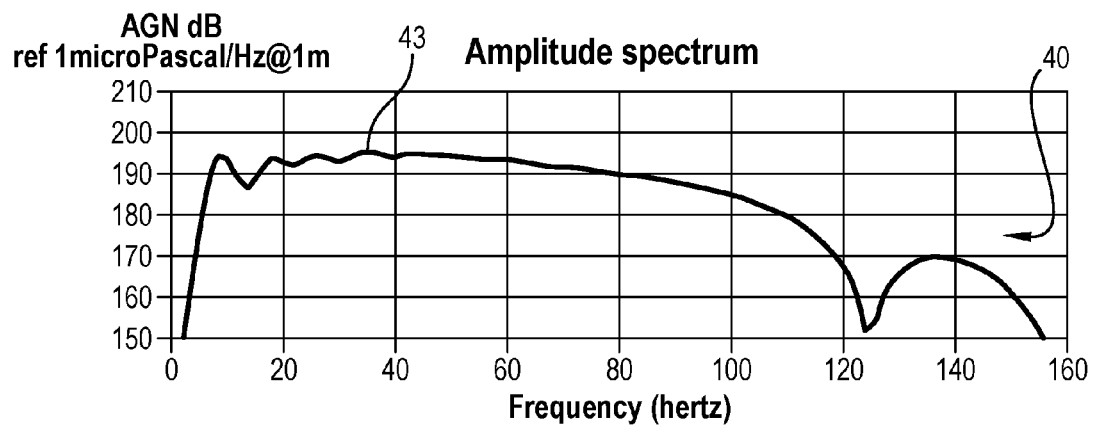

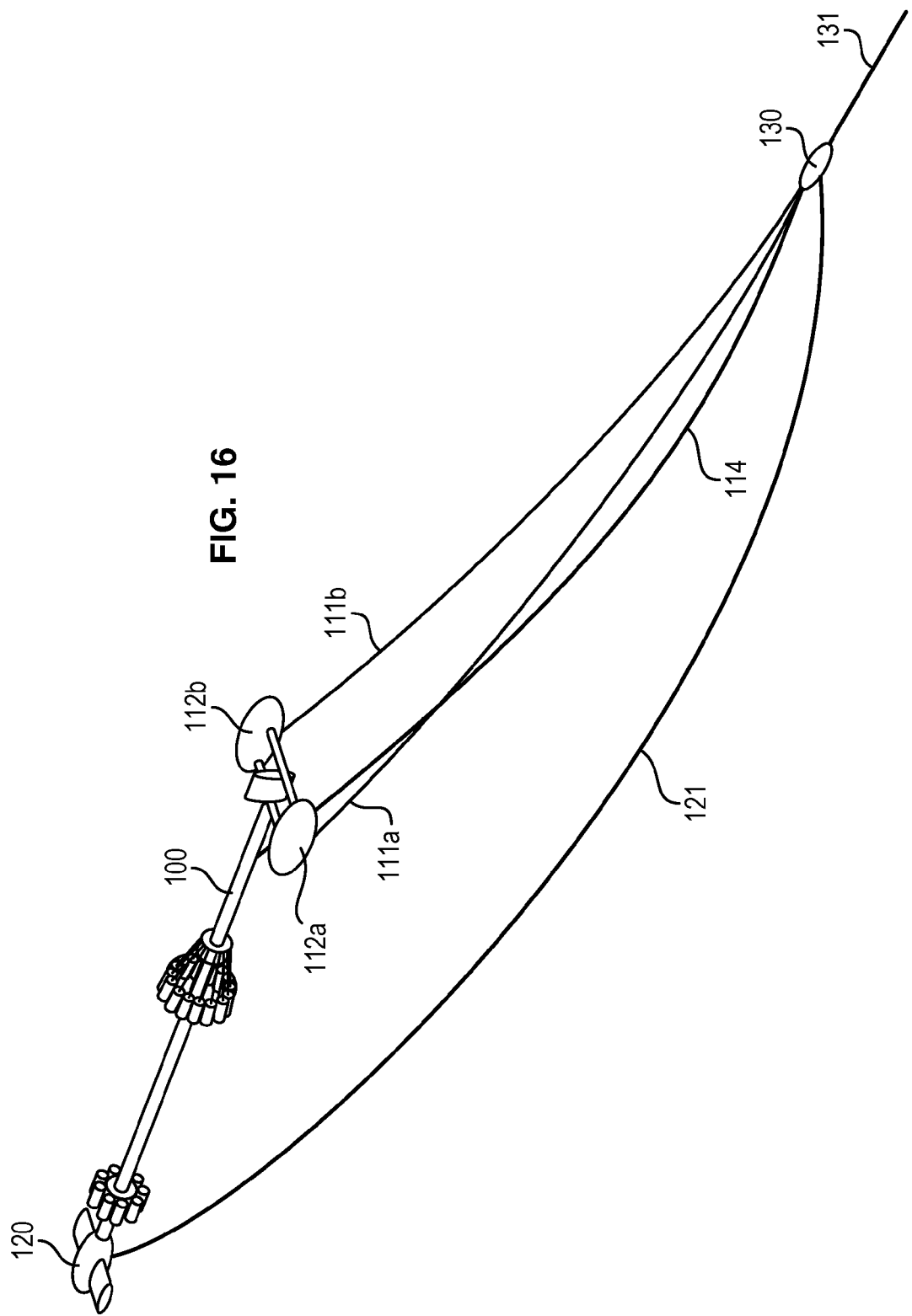

MARINE SEISMIC SOURCE

The present invention relates to the field of acoustic energy sources for marine seismic exploration.

The invention more particularly concerns an improved device as source of acoustic energy which can be used to generate energy in water, in the form of an acoustic wave.

STATE OF THE ART

One widespread technique for oil or gas prospection comprises a seismic survey of the seafloor. To image the structure of the seafloor, geophysicians use so-called seismic-reflection techniques.

In marine seismics, the most frequent technique comprises towing behind a vessel:
- one or more energy sources for the emission of an acoustic wave, and
- seismic receivers arranged on cables called streamers.

The source sends an acoustic wave into the water, by setting up a field of compression waves which propagates coherently and downwardly (downward propagation). When the wave field strikes interfaces between geological formations, called reflectors, reflections occur which propagate through the Earth and water as far as the seismic receivers (upward propagation) where they are converted into electric signals and recorded.

Seismic receivers are arranged in such manner and in sufficient number so that, from the recorded signals called traces, it is possible to produce images of the configuration of the geological strata.

As illustrated in FIGS. 1 and 2, a marine seismic source 1 conventionally comprises a plurality of airguns 10 arranged along a rectilinear sub-array 11 of rigid type (beams) or flexible type (chains).

Each airgun 10 fires a sudden burst of compressed air under high pressure into the water to cause a seismic wave which propagates down into the seafloor.

It is known to group airguns in groups of three to produce a single bubble from the elementary bubbles generated by the three airguns.

For this purpose, three airguns are positioned in the immediate vicinity of each other, so that the elementary bubbles generated by the three airguns coalesce to form one bubble having a period of greater oscillation than the three elementary bubbles.

This makes it possible, from three airguns of low power, to produce a resulting bubble whose characteristics are equivalent to those obtained with a single airgun of greater power.

Since the airguns lie very close to each other in the proposed arrangements, the resulting bubble—produced from the spherical elementary bubbles produced by the three airguns—has a spherical geometry.

It is ascertained that the resulting bubble has an irregular amplitude spectrum, in other words oscillations of large amplitude. The assumed reason is the resistance opposed by the hydrostatic pressure of the surrounding marine environment.

The invention sets out to obtain a bubble with a more regular amplitude spectrum than in the conventional technique in which a spherical bubble is formed by coalescence.

DISCLOSURE OF THE INVENTION

The invention proposes a seismic wave emitting device for the acquisition of seismic data at sea, the device comprising means capable of firing compressed air under high pressure into the water, said means being arranged to generate a bubble of a general annular shape.

The device of the invention may have the following characteristics:
- the means comprise a plurality of compressed air sources, each source of compressed air allowing an elementary bubble to be generated, said sources of compressed air being positioned relative to one another so as to generate the bubble of a general annular shape from the elementary bubbles;
- the distance $d_{ajd}$ between two adjacent compressed air sources is shorter than the distance $d_{nonadj}$ between two non-adjacent compressed air sources, said distances being chosen so that the elementary bubbles formed by two adjacent compressed air sources coalesce, whereas the elementary bubbles formed by two non-adjacent compressed air sources do not coalesce;
- each source of compressed air comprises a pair of airguns;
- the distance between two adjacent compressed air sources lies between 0.3 meter and 1.5 meter;
- the mean distance between a compressed air source and the barycentre of the compressed air sources is equal to or greater than 2 meters;
- the means comprise support-bars, each compressed air source being fixed to a respective support-bar;
- the bubble of a general annular shape produced by the device is of generally toroidal shape.

A method for emitting seismic waves is also proposed, noteworthy in that it comprises a step to discharge compressed air under high pressure into water, arranged to generate a bubble of a general annular shape.

PRESENTATION OF THE FIGURES

Other characteristics and advantages of the invention will become further apparent from the following description which is non-limiting and solely given for illustration purposes, and is to be read in connection with the appended drawings in which:

FIGS. 1 and 2 schematically illustrate prior art devices;

FIGS. 5 and 6 illustrate amplitude spectra obtained from devices adapted to generate a spherical bubble;

FIGS. 11 to 16 illustrate a second embodiment of a device adapted to generate a toroidal bubble.

DESCRIPTION

Figure 1:
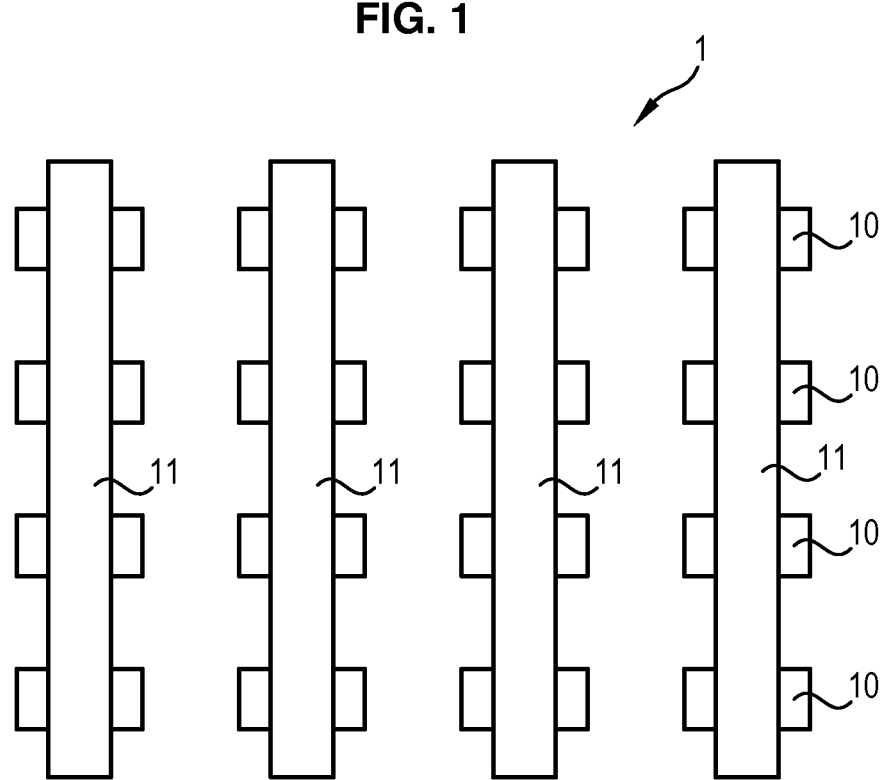
Figure 2:
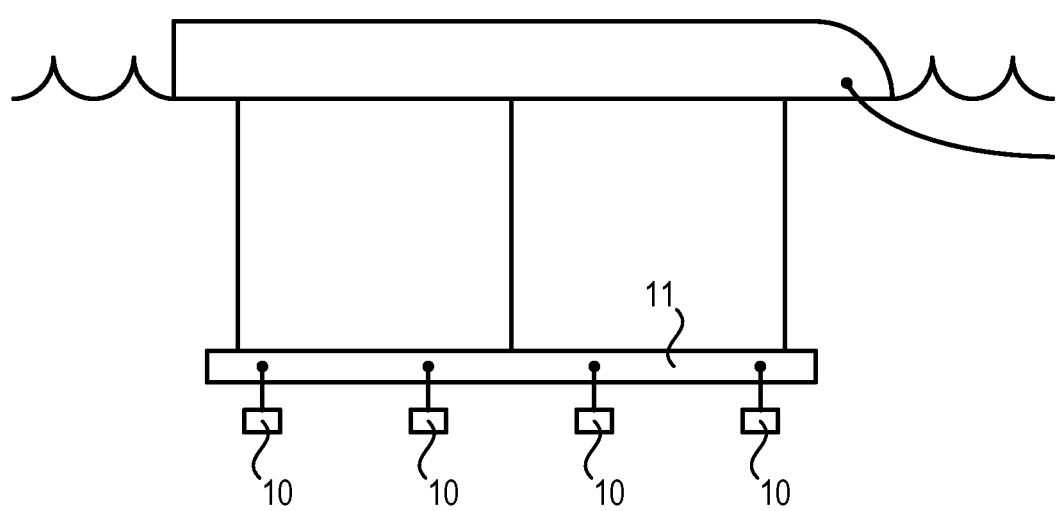
Figure 3:
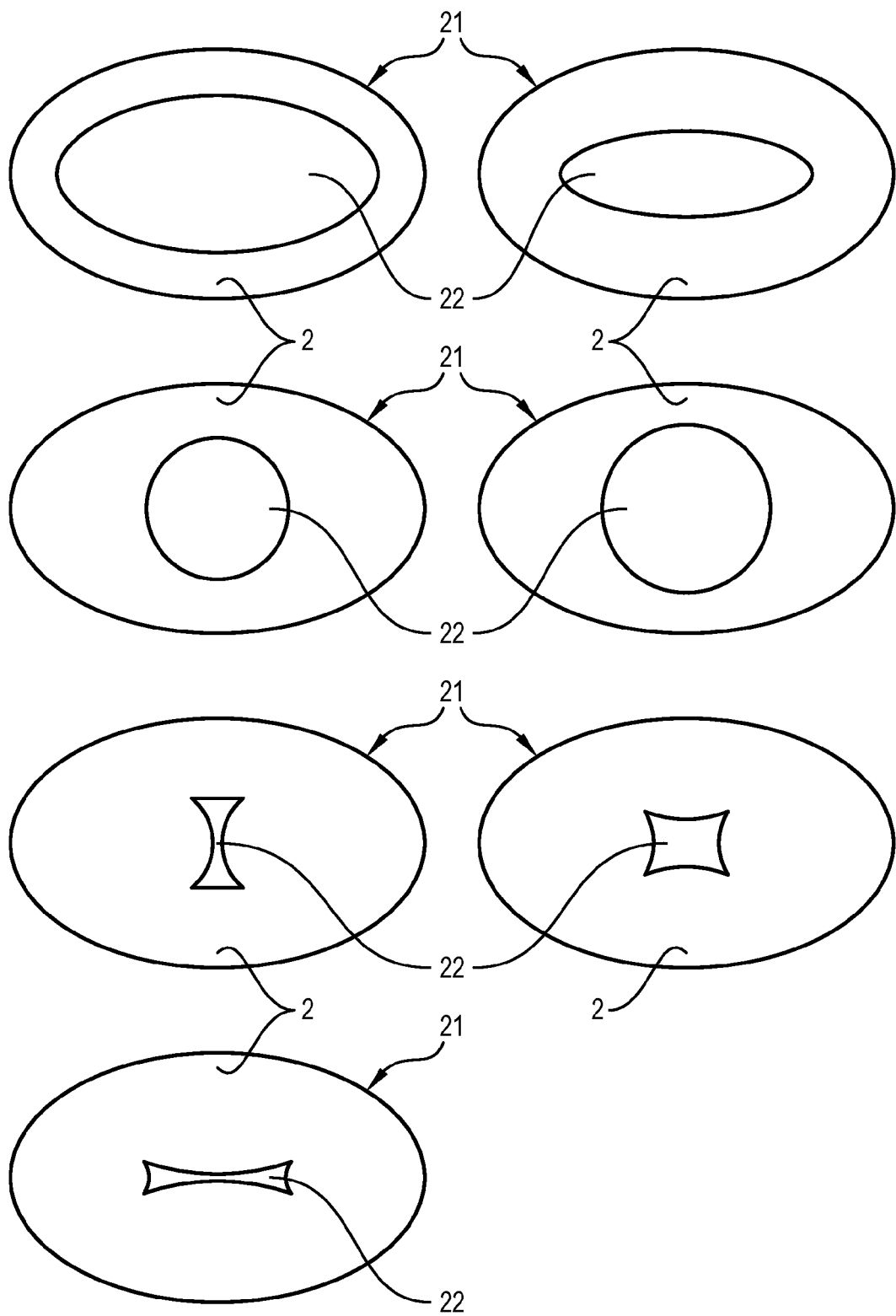
FIG. 3 shows different examples of the transverse profile of toroidal bubbles.
Figure 4:
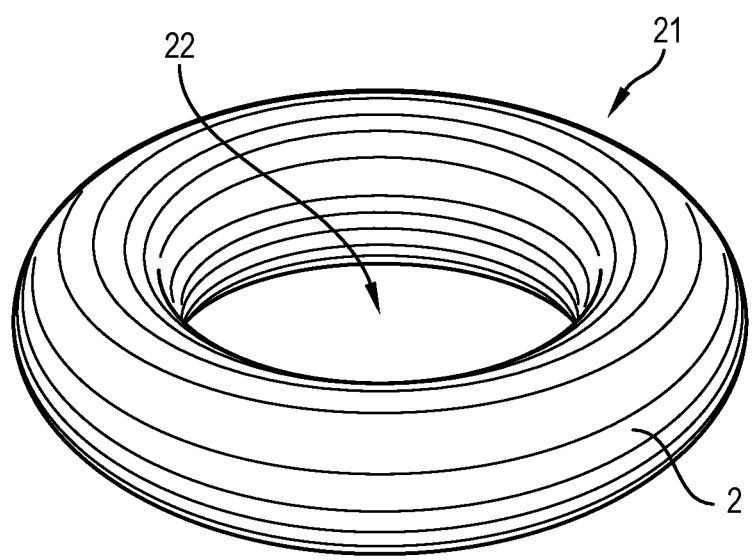
FIG. 4 shows an example of a toroidal bubble in three dimensions.

The air bubble generated by a device emitting seismic waves, in the examples shown in cross-section in FIG. 3, is of general toroidal shape. The examples in FIG. 3 illustrate different geometries for the bubble. FIG. 4 shows one of these geometries namely a toroidal bubble in three dimensions.

It is to be noted that a bubble of general toroidal shape is itself a particular form of bubble having a general annular shape.

One characteristic of a bubble having general annular or toroidal geometry is that it defines two regions in the marine medium, an outer or peripheral region 21 and an inner region 22.

Owing to this characteristic, the bubble has reduced oscillation. This seems to be related to the resistance opposed by the pressure of the water in the inner region.

One commercially available software programme for modelling seismic airguns, called "GUNDALF", has provided a very promising overview of the acoustic wave characteristics of a toroidal bubble. FIGS. 5 and 6 allow a comparison of the amplitude spectrum obtained using an airgun generating a spherical bubble with different examples of embodiment of the seismic wave emitting device adapted to generate a toroidal bubble.

FIG. 5 shows the amplitude spectrum 30 obtained from a device 3 comprising a single airgun 31 generating a spherical bubble 32. It can be seen that the amplitude spectrum 30 of this device 3 comprises a plurality of oscillations 33 related to the oscillations of the bubble 32. These oscillations 33 are due firstly to expelling of air by the airgun 31, and secondly to the hydrostatic forces exerted on the spherical bubble 32. More precisely, the expelling of air by the airgun 31 tends to increase the volume of the spherical bubble 32 whilst the hydrostatic forces tend to compress it. This gives rise to oscillations in the amplitude spectrum of said device 3.

FIG. 6 illustrates the amplitude spectrum 40 obtained from a first example of a device 4 adapted to generate a bubble of general toroidal shape 44. This device comprises a plurality of airguns 41 distributed in a circle. This device allows a bubble to be generated of general toroidal shape 44 from a plurality of spherical bubbles 42 produced by the airguns 41. It is ascertained that the oscillations 43 of the amplitude spectrum 40 of this device 4 are attenuated compared with the oscillations 33 of the amplitude spectrum 30 obtained with a device 3 generating a spherical bubble. This attenuation can be attributed to the presence of liquid medium in the inner region 22 which offers resistance to the oscillations.

It follows from FIGS. 5 and 6 that the amplitude spectrum of the oscillations of a bubble of general toroidal shape is of smaller scale than that of a spherical bubble. Only the first period of the amplitude spectrum of a toroidal bubble shows significant oscillation.

It is also apparent that the acoustic wave generated by a toroidal bubble is entirely isotropic in the axial direction owing to the symmetry of rotation of the toroidal bubble. This leads to a reduced "notch" in the amplitude spectrum of the seismic source due to reflection on the surface of the water, called a ghost effect.

The fact that the oscillation spectrum of a toroidal bubble only comprises a single oscillation and that the toroidal bubble has a single compression wave propagating towards the seafloor facilitates the processing operations that need to be performed to produce images of the sub-surface from seismic data.

Figure 7:
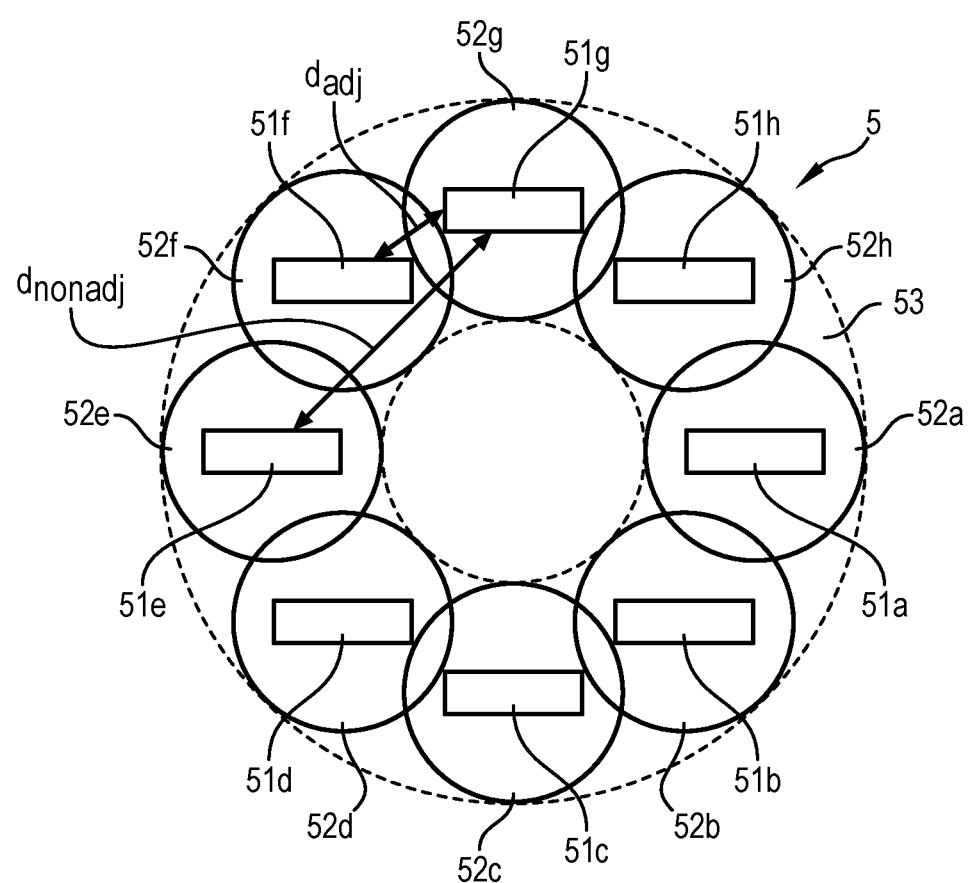
FIGS. 7 to 9 illustrate a first embodiment of a device adapted to generate a toroidal bubble.

FIG. 7 illustrates a schematic view of an example of a device allowing a bubble of a general annular shape to be generated.

This device 5 comprises a plurality of compressed air sources 51a to 51g, eight sources in the illustrated example. Under the present invention by "compressed air source" is meant an assembly comprising one or more airguns (typically on, two or three airguns) producing a spherical elementary bubble 52a to 52g.

The compressed air sources 51a to 51g are distributed in general annular geometry, which may or may not extend substantially over a plane.

In all cases, the compressed air sources 51a to 51g are positioned relative to one another so that they generate a resulting bubble 53 of a general annular shape from the spherical elementary bubbles 52a to 52g.

More precisely the compressed air sources 51a to 51g are arranged so that:
the spherical elementary bubbles 52a-52b, 52b-52c, ..., 52g-52a generated by two adjacent compressed air sources 51a-51b, 51b-51c, ..., 51g-51a, coalesce,
the spherical elementary bubbles of non-adjacent compressed air sources do not coalesce.

For this purpose, the distance $d_{ajd}$ between two adjacent compressed air sources is chosen to be shorter than the distance $d_{nonadj}$ between two non-adjacent compressed air sources.

The values of these distances $d_{ajd}$, $d_{nonadj}$ may vary in relation to the power and volume of the compressed air sources 51a to 51g used in the device 5. For example, the distance $d_{ajd}$ between two adjacent compressed air sources may lie between 50 and 150 cm, or of the order of 60 to 120 cm. In addition, the mean distance between the compressed air sources and their barycentre may be equal to or greater than 2 meters.

The fact that the compressed air sources 51a to 51g are arranged so that the elementary bubbles of non-adjacent compressed air sources do not coalesce makes it possible to group together more than three sources of compressed air. It is therefore possible to provide a seismic wave emitting device that is more powerful than the prior art devices, or to obtain a seismic wave emitting device of equivalent power to prior art devices using less powerful compressed air sources which are less costly.

A description will be given below of examples of embodiments of support-structures to maintain the compressed air sources arranged in an annular pattern.

Figure 8:
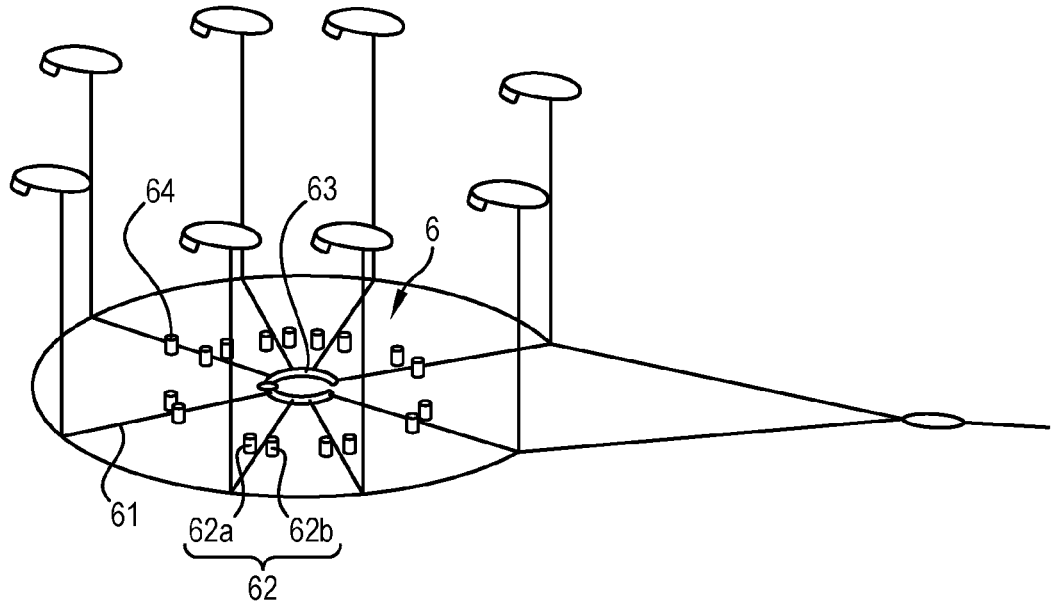

In one embodiment illustrated in FIG. 8, the support-structure is of star type as described in document WO 2009/063035. The seismic wave emitting device 6 comprises at least three support-bars 61, compressed air sources 62 (each comprising a pair of airguns 62a, 62b) positioned along each support-bar 61, a central connecting element 63 receiving one end of the support-bars 61, the connecting element 63 being arranged so that the support-bars 61 can be deployed in a star geometry, and means to hold the support-bars in this operating geometry.

With a star geometry, the compressed air sources 62 of one support-bar 61 can be prevented from coming into contact with the compressed air sources 62 of another support-bar under the effect of sea swell or currents. This structure allows said geometry to be obtained whilst meeting operational requirements regarding deployment, operational geometric stability and retrieval on-board the vessel. This ensures precise relative positioning of the compressed air sources 62 when in operation.

By arranging the compressed air sources 62 on this device in a circular pattern, the adjacent compressed air sources 62 being sufficiently close so that the bubbles they generate can coalesce and the non-adjacent compressed air sources being sufficiently distant so that the bubbles they generate do not coalesce, it is possible to produce a bubble of a general annular shape, e.g. a bubble of toroidal shape.

Advantageously, the device may comprise a least one airgun 64 arranged outside the pattern at a distance from it, such that the elementary bubble of the airgun 64 outside the pattern coalesces with the elementary bubble of the closest lying compressed air source 62. This allows reinjection of air into the bubble having the shape of a bent-over tube. This reinjection of air has the advantage of further improving the emission spectrum of the seismic wave emitting device.

Figure 9:
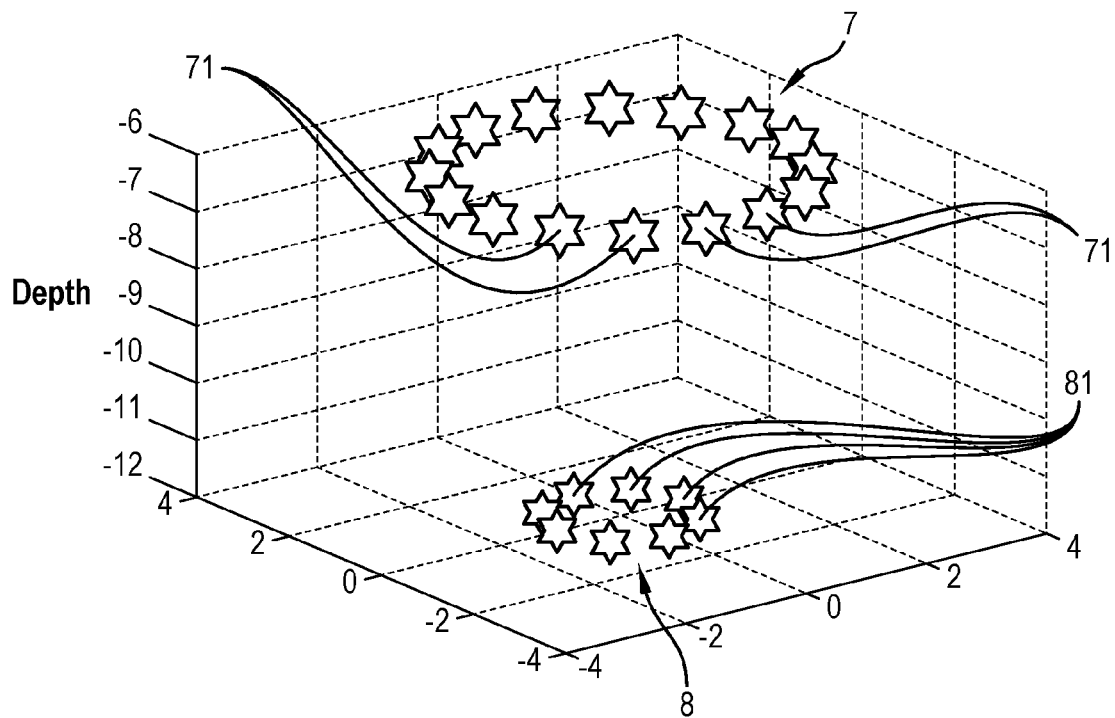
Figure 10:
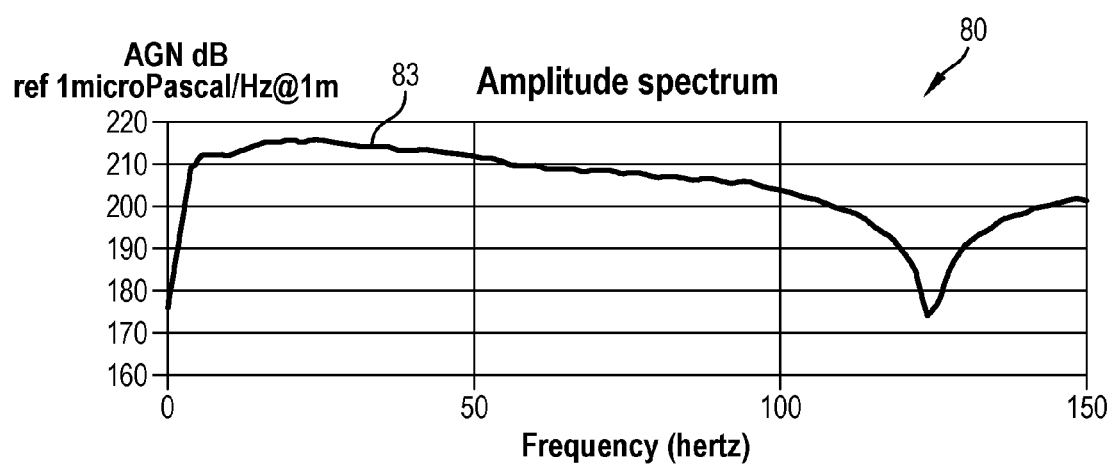
FIG. 10 illustrates an amplitude spectrum obtained using a device such as illustrated in FIGS. 7 to 9.

To further improve the amplitude spectrum of the seismic wave emitting device, it is possible to arrange two means 7, 8 capable of generating a toroidal bubble at two different depths, as illustrated in FIG. 9. Each of said means 7 (respectively 8) may comprise a plurality of compressed air sources 71 (respectively 81) arranged so that the elementary bubbles of adjacent bubbles coalesce and the elementary bubbles of non-adjacent sources do not coalesce. The amplitude spectrum of said device is illustrated in FIG. 10. It can be seen that the oscillations 83 of the amplitude spectrum 80 of this device are attenuated compared with the oscillations 43 of the amplitude spectrum 40 obtained with the device illustrated in FIG. 6.

Another example of embodiment is illustrated in FIGS. 11 to 16.

The device comprises a supporting structure of elongate shape, or mast 100, designed to carry one or more marine seismic sources. In the illustrated embodiment, the device comprises two sources generally designated 200, 300 positioned on the mast 100 at respective positions spaced apart in the longitudinal direction of the mast.

Figure 11:
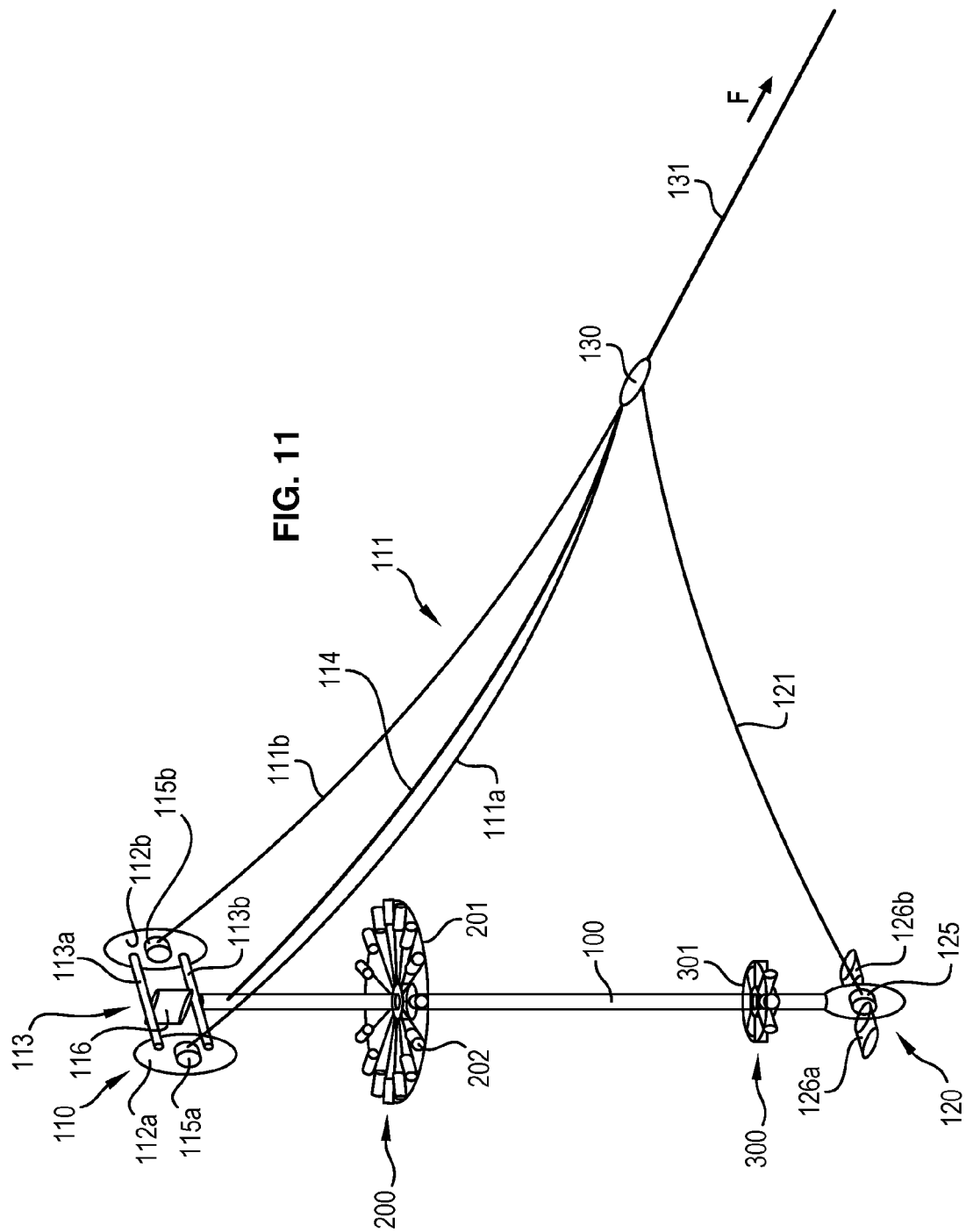
Figure 12:
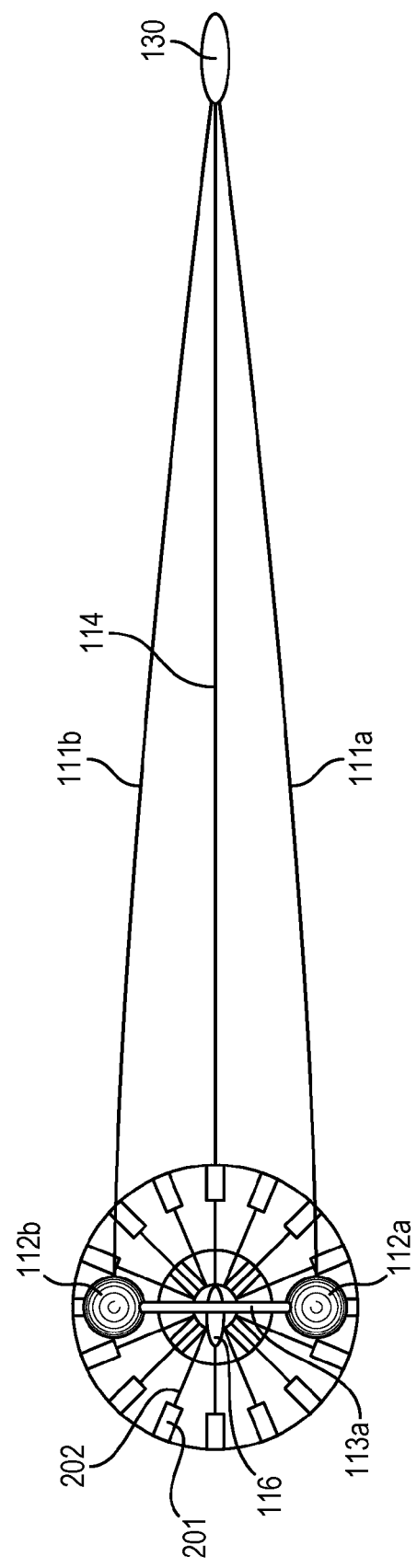
Figure 13:
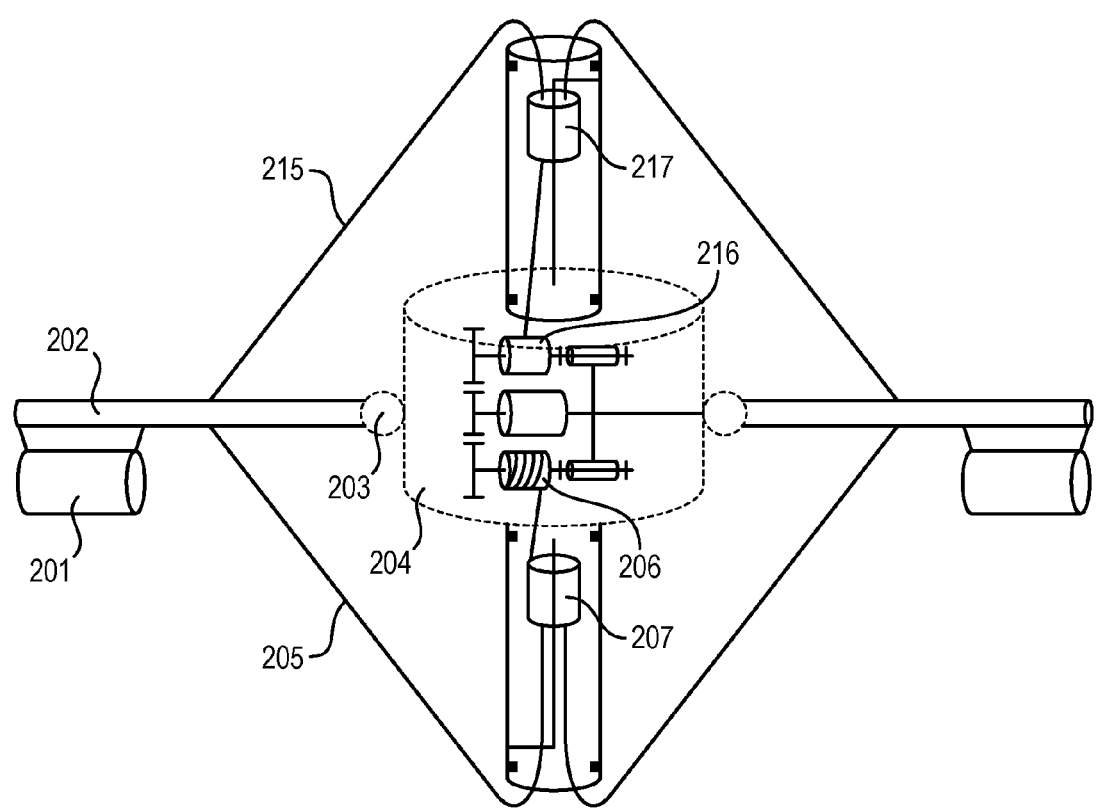
Figure 14:
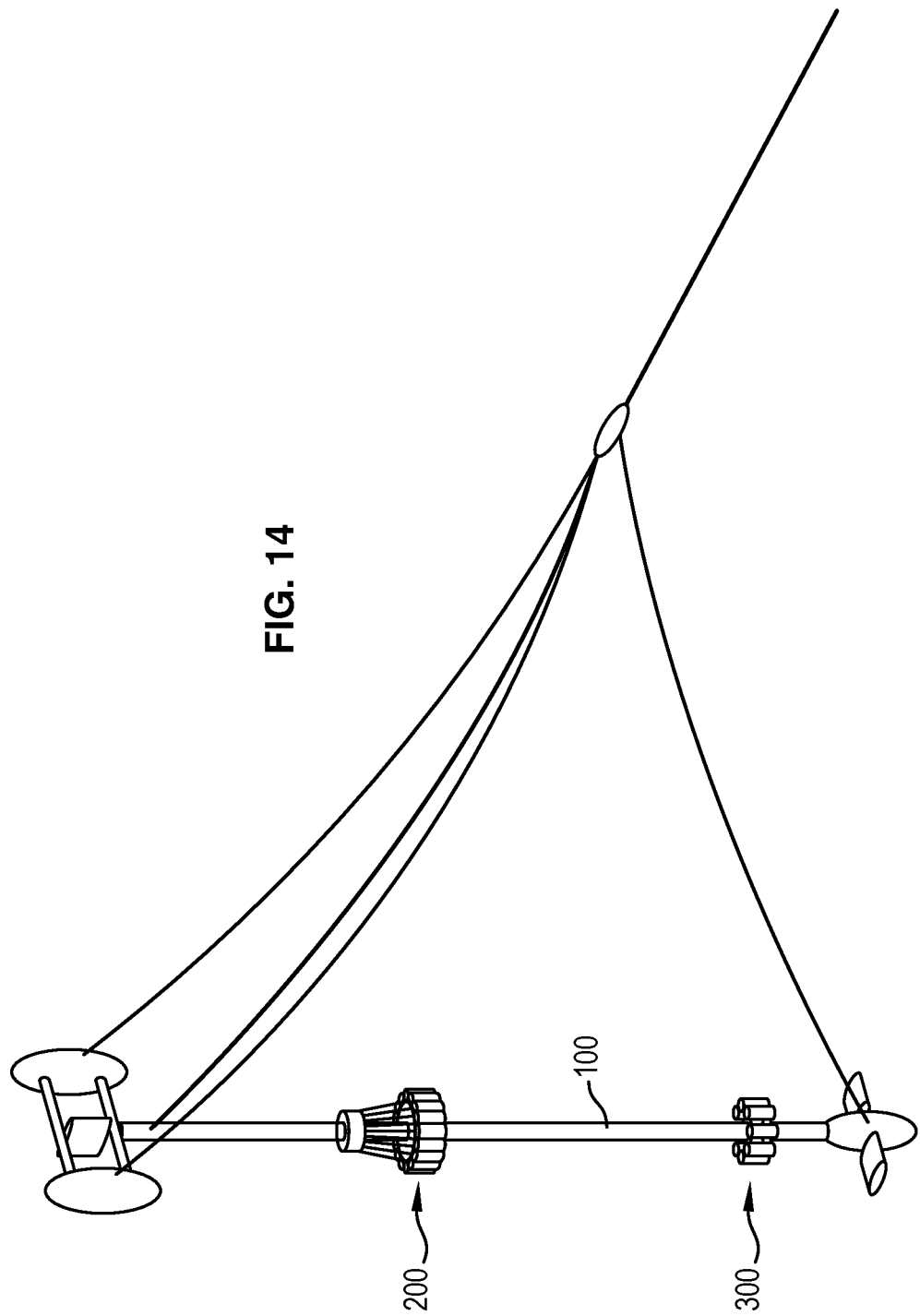

The device comprises means used to tow the mast 100 from a vessel, not illustrated, holding it in substantially vertical position as shown in FIGS. 11 to 13. In the remainder hereof, the terms "upper" and "lower" will be used to refer to the vertical position of the mast illustrated in FIGS. 11 and 12 and the term "transverse" with reference to the direction of towing by the vessel, indicated in FIG. 11 by the arrow F.

These means comprise means to hold the mast 100 in vertical position, including:
- a float assembly 110 located at the upper end or close to the upper end of the mast 100;
- a lower ballastable compartment 120 located at the lower end or close to the lower end of the mast 100.

These means also comprise means for towing by a vessel, including a link assembly 111 linked to the float assembly 110 or to the upper end of the mast 100, and a link element 121 linked to the lower compartment 120.

The float assembly 110 can be fabricated in different manners.

The embodiment illustrated is designed to promote the navigational stability of the device both in deployed, substantially vertical position, and in the substantially horizontal retrieval position illustrated in FIG. 16. According to this embodiment, the float assembly 110 comprises two floats 112a, 112b mounted symmetrically either side of the mast 100 in a transverse plane relative to the direction of towing indicated by the arrow F. The floats 112a, 112b are fixed to a rigid support 113 globally oriented along the aforementioned plane and which, in the illustrated embodiment, comprises two parallel bars, an upper bar 113a and a lower bar 113b attached to the mast 100 at its upper end.

According to the illustrated example of embodiment, the link assembly 111 comprises two mechanical link elements 111a, 111b respectively linked to the floats 112a, 112b and which may be formed by metal cables or synthetic ropes adapted for hauling, and an umbilical 114 for electric transmission and the supply of compressed air towards the sources 200, 300 which is connected to the mast 100 in the vicinity of the upper end thereof. Like the link elements 111a, 111b, the link element 121 may be formed of a metal cable or synthetic rope adapted for hauling.

In the illustrated embodiment, the front ends of the link elements 111a, 111b and of the link element 121 are connected to a junction element 130 of bend stiffener type mounted on the umbilical 114 and 131.

In the illustrated embodiment the link element 131 is an umbilical comprising a hauling element. The umbilical also comprises electric conductors and a compressed air line needed to operate the seismic sources 200, 300.

One variant of embodiment, not illustrated, consists of connecting the floats 112a, 112b to a single link element connected on the front side to junction part 130 and on the rear side (the side of the mast) to a second junction part, the floats being connected to this second junction part by respective link elements of short length.

In another embodiment, not shown, the upper part comprises a single main float mounted on the mast 100 so as to form the upper end thereof. Auxiliary floats of smaller dimensions are connected thereto, either side thereof, whose main function is to stabilize navigation when the device is returned to horizontal position for on-board retrieval. In this embodiment, the layout of the link elements connecting this assembly comprising the main float and its stabilizing floats to the junction part 130 can be substantially similar to the one defined in the embodiment described previously. For manoeuvring of the mast 100 to cause it to move from a vertical position such as illustrated in FIG. 11 to a substantially horizontal position adapted for on-board retrieval, illustrated in FIG. 16, or reciprocally for operational deployment, means are provided that are arranged to modify the length of the link elements connecting the junction part 130 to the float assembly 110 and to the lower compartment 120. These means may be formed by motorized winches suitably mounted on the float assembly 110 (winches 115a, 115b) and on the lower compartment 120 (winch 125), and on which the ends of the link elements are wound. In the illustrated example of embodiment comprising two floats 112a, 112b, each of the floats carries a winch 115a; 115b, on which the respective ends of the link elements 111a, 111b will be wound. These winches are provided with means allowing their operation to be controlled from the vessel via instructions transmitted through the umbilical 114 or, as a variant, by remote control.

In the illustrated example of embodiment, the device is further equipped with lateral piloting means. These means comprise a rudder 116 for navigational assistance mounted on the upper end of the mast 100. The rudder 116, as can be better seen in FIG. 12, is mounted, as is conventional, so that its neutral position is oriented in the towing direction and so that it is fully immersed during towing. The piloting means may also comprise elements mounted on the lower end of the mast 100. Therefore, in the illustrated example of embodiment, stabilizing fins 126a, 126b are provided, fixed to the lower compartment 120 either side thereof and are arranged substantially in a transversal plane to the axis of the mast 100, hence substantially horizontal in the position illustrated in FIG. 11.

The mast 100 can be fabricated in different manners provided that it has the desired rigidity and floatability, and that it is capable of receiving the electric cables and air supply line needed to operate the sources 200, 300 and to actuate the lateral piloting members and aforementioned winches. Thus, the mast 100 may have a tubular structure. This structure may be watertight or it may comprise water inlets.

Figure 15:
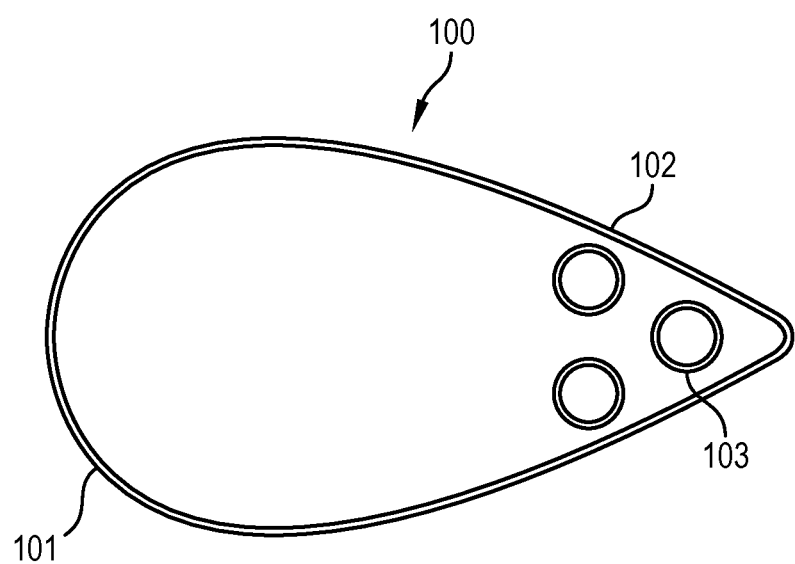

Also, the mast may have a circular outer cross-section as shown in FIG. 12. However, it is also possible to envisage a non-circular cross-section optimized for hydrodynamic entry such as illustrated in FIG. 15. Said cross-section typically comprises a substantially semi-circular front part 101 and a profiled rear part 102 with decreasing cross-section to minimize turbulence. It is also possible, for comparable results, to envisage a tubular structure of circular cross-section on whose rear part a profiled structure of decreasing cross-section is attached. FIG. 15 shows tubular elements 103 housed inside the mast and parallel to the axis thereof, intended to receive electric conductors and a compressed air supply line. Supporting members, not shown, are provided to hold the elements 103 in place inside the mast. Stiffener elements may also be provided inside the mast to ensure the desirable rigidity of the structure.

The mast may also be used to support other types of components such as hydrodynamic appendages, sensors or even turbines generating electricity.

The geometry of the above-described device with a mast 100 to carry the sources that is held in vertical or substantially vertical position, offers possible advantageously compact architectures for the sources, and notably geometries with symmetry of revolution about the mast 100.

The illustrated embodiment therefore comprises sources 200 and 300 having a geometry with symmetry of revolution about the longitudinal axis of the support 20. More precisely, each of the sources 200, 300 is globally in the shape of a circle centred on the longitudinal axis of the mast 100, and comprises a plurality of compressed air sources or airguns, respectively 201, 301, arranged at angle positions regularly distributed around the mast 100.

Each of the airguns 201, 301 is mounted at the end of or along a respective support-bar 202, 302 connected to the mast 100. Different modes can be envisaged for mounting the airguns on the support-bars, in which the axis of the airguns may lie in the vertical direction or in the horizontal direction. In this latter arrangement shown in the figures, the airguns 201 are oriented radially i.e. along the horizontal axis of their associated support-bar.

To allow the supplying of air and electricity to the airguns 201, 301, the support-bars 202, 302 may comprise a recess intended to receive electric cables and an air supply line.

The support-bars 202, 302 may be connected to the mast 100 via hinges. In this case, the support-bars are able to be moved between a retracted position (FIG. 12) in which the support-bars lie substantially parallel, and a deployed position (FIG. 11) in which the support-bars are arranged in one same plane substantially orthogonal to the longitudinal axis of the mast 100 and form a star pattern.

In the embodiment illustrated in FIGS. 11 to 13, the mode in which the support-bars 202, 302 are moved can be compared with that of the ribs of an umbrella. This also facilitates retrieval of the device on-board the vessel, for example to repair a faulty airgun or when the seismic acquisition operation is completed.

To enable the movement of the support-bars 202, 302 between the retracted and deployed positions, different modes can be envisaged.

One means which can be envisaged is illustrated in FIG. 5. FIG. 5 only shows source 200 but evidently the same type of means would be provided for source 300. It can be seen in FIG. 5 that the support-bars 202 carrying the airguns 201 are connected by hinges 203 to a central structure such as a caisson 204 mounted around the mast 100, so that each support-bar 202 is able to pivot in its radial plane. Connecting cables 205, 215 are provided connecting the centre of the support-bars 202 to length-adjustment members mounted in the caisson 204 on either side of the source, these comprising motorized pulleys 206, 216 respectively connected to junction members 207, 217 placed inside the mast 100 either side of the caisson 204, to which the assembly of connecting cables 205 (resp. 215) is connected. The adjustment members can be actuated to modify the length of the assembly of connecting cables 205 lying on one side of the source in one direction, and the assembly of connecting cables 215 lying on the other side in the opposite direction, so as to move the ends of the support-bars 202 and hence the airguns in the desired direction. The connecting cables 205, 215 also fulfil a geometric stabilizing role for the support-structures consisting of the assembly of hinged support-bars and circumferential connecting elements. The radiating arrangement of these connecting elements generates strutting which limits movements of the support-bars upwards or downwards.

Variants can be envisaged of the description given with reference to FIG. 5. For example, instead of the motorized pulleys 206, 216, it could be envisaged to use a mechanical device ensuring movement parallel to the longitudinal axis of the mast 100.

It will be noted in the illustrated example, that the source 200 forms a circle of larger radius than the source 300, in other words the airguns 201 forming source 200 lie further distant from the axis of the mast 100 than the airguns 301 forming source 300. However, this is only an example given by way of illustration. The choice of dimensions, and the distance between the positions of the sources along the longitudinal axis of the mast 100 are a function of the desired characteristics for the seismic waves produced by the sources and for inter-wave interactions.

Once the seismic acquisition is completed, the device must be brought back on-board the vessel. One first step consists of placing the sources 200, 300 in retracted position using the above-described means. Therefore, should these means comprises connecting cables; the length of these cables must be modified to control the retracting of the support-bars 202, 302.

A second step comprises bringing the device up to the surface of the water. For this purpose, compressed air can be injected into the lower compartment 120 located at the lower end of the mast 100 for deballasting thereof. The floatability induced by deballasting the lower compartment 120 induces movement of the lower end of the mast 100 towards the surface of the water. Owing to drag force, the movement of the lower compartment 120 occurs naturally towards the rear; the winch 125 incorporated in this compartment is used to unwind the link element 121 to allow this movement towards the rear and towards the surface of the water. The stabilizing fins 126a, 126b can provide assistance for fine-tuned piloting of this rise to the surface.

The device is therefore moved from a vertical position (in which the mast 100 lies substantially perpendicular to the surface of the water) to a horizontal position (in which the mast 100 lies substantially parallel to the surface of the water).

Once the device is placed in horizontal position, it is brought back inside the vessel using conventional hoisting arms for example mounted on the vessel.

The reader will appreciate that numerous modifications can be made to the invention such as described above without materially departing from the teachings of this document.

Thus, the distribution, volumes and shapes of the float elements, of the piloting means, of the lower compartment(s), their arrangements and their modes of structural connection to the mast can follow different geometries. Similarly, the support structures for the airguns can have different geometries, planar or non-planar, and can be foldable or fixed.

For example, in the embodiment illustrated in FIG. 7, the airguns forming each source are distributed in a circle.

Evidently the airguns can be distributed in another pattern such as an ellipse. This can be achieved with support-bars (202; resp. 302) of same length for a given source, by mounting the air guns on the support-bars at different distances from the axis of the mast, the distances being chosen to obtain the desired geometry for the pattern formed by the airguns.

Additionally, the embodiment described in the foregoing comprising two sources at different depths is evidently only given as an example. The device may comprise only one source, or it may comprise more than two sources e.g. three sources located in deployed position at different respective depths.

Also, the axis of the mast 100 may not be strictly vertical, it may be tilted at an angle determined when deploying the device during the operational phase to promote a given orientation for emission of the acoustic waves. This can be achieved by appropriate controlling of the winches 115a, 115b and 125.

It will be appreciated that numerous modifications can be made to the invention such as described above without materially departing from the teachings of the present document.

The invention claimed is:

1. A device for emitting seismic waves into water, the device comprising:
   a support structure; and
   plural air sources attached to the support structure and configured for discharging compressed air under high pressure into water, the plural air sources being arranged on the support structure to have an annular geometry to generate a resulting bubble of a general annular shape while an air source of the plural air sources generates a spherical bubble.

2. The device according to claim 1, wherein each air source generates an elementary bubble having a spherical shape.

3. The device according to claim 2, wherein a distance $d_{adj}$ between two adjacent air sources is shorter than a distance $d_{nonadj}$ between two non-adjacent air sources, said distances being chosen so that the elementary bubbles formed by two adjacent air sources coalesce whilst the elementary bubbles formed by two non-adjacent air sources do not coalesce.

4. The device according to claim 2, wherein each air source comprises a pair of airguns.

5. The device according to claim 3, wherein the distance between two adjacent air sources lies between 0.3 meter and 1.5 meters.

6. The device according to claim 3, wherein a mean distance between an air source and the barycenter of the air sources is equal to or greater than 2 meters.

7. The device according to claim 1, wherein the support structure comprises:
   support-bars for supporting the plural air sources.

8. The device according to claim 1, wherein the resulting bubble is of general toroidal shape.

9. A method for emitting seismic waves, the method comprising:
   arranging plural air sources on a support structure to have an annular geometry; and
   discharging from the plural air sources compressed air under high pressure into water to generate a resulting bubble of a general annular shape,
   wherein an air source generates a spherical bubble.

10. The method according to claim 9, wherein each air source generates an elementary bubble having a spherical shape.

11. The method according to claim 9, wherein a distance $d_{ajd}$ between two adjacent air sources is shorter than a distance $d_{nonadj}$ between two non-adjacent air sources, said distances being chosen so that the elementary bubbles formed by two adjacent air sources coalesce whereas the elementary bubbles formed by two non-adjacent air sources do not coalesce.

12. The method according to claim 9, wherein the distance between two adjacent air sources lies between 0.3 meter and 1.5 meters.

13. The method according to claim 9, wherein a mean distance between an air source and the barycentre of the plural air sources is equal to or greater than 2 meters.

14. The method according to claim 9, further comprising:
   placing in position at least one additional air source, at a distance such that the elementary bubble of the additional air source coalesces with the elementary bubbles of the closest air sources of the plural air sources.

15. The device according to claim 1, further comprising:
   an additional air source spaced apart from the plural air sources so that an elementary bubble generated by the additional air source re-injects air into the resulting bubble.

16. The device according to claim 1, further comprising:
   a mast around which the plural air sources are located at a first location; and
   another plurality of air sources distributed around the mast at a second location and configured to generate another resulting bubble of a general annular shape.

17. The device according to claim 16, further comprising:
   a float assembly connected to one end of the mast; and
   a ballasted compartment attached to the other end of the mast for aligning the mast with gravity when deployed in water.

18. The device according to claim 16, further comprising:
   a rudder attached to the mast for navigational assistance.

19. The device according to claim 16, further comprising:
   winches for changing an orientation of the mast from a vertical position to a horizontal position.

20. The device according to claim 1, wherein the plural air sources are distributed along a circle.

* * * * *

UNITED STATES PATENT AND TRADEMARK OFFICE
CERTIFICATE OF CORRECTION

| | | |
|---|---|---|
| PATENT NO. | : 8,770,336 B2 | Page 1 of 1 |
| APPLICATION NO. | : 13/811919 | |
| DATED | : July 8, 2014 | |
| INVENTOR(S) | : Vahida et al. | |

It is certified that error appears in the above-identified patent and that said Letters Patent is hereby corrected as shown below:

Specification

In Column 2, Line 11, delete "$d_{ajd}$" and insert -- $d_{adj}$ --, therefor.

In Column 4, Line 8, delete "$d_{ajd}$" and insert -- $d_{adj}$ --, therefor.

In Column 4, Line 12, delete "$d_{ajd}$," and insert -- $d_{adj}$, --, therefor.

In Column 4, Line 15, delete "$d_{ajd}$" and insert -- $d_{adj}$ --, therefor.

Claims

In Column 10, Line 9, in Claim 11, delete "$d_{ajd}$" and insert -- $d_{adj}$ --, therefor.

Signed and Sealed this
Second Day of February, 2016

Michelle K. Lee
*Director of the United States Patent and Trademark Office*